United States Patent Office 3,549,394
Patented Dec. 22, 1970

3,549,394
LOW THERMAL EXPANSION
CERAMIC MATERIAL
Anthony J. Perrotta, Nanuet, N.Y.
(950 Harvard Road, Monroeville, Pa. 15146)
No Drawing. Filed Dec. 18, 1967, Ser. No. 691,148
Int. Cl. C04b 33/00
U.S. Cl. 106—39  3 Claims

ABSTRACT OF THE DISCLOSURE

A single phase solid solution of beta-eucryptite and $AlPO_4$ having the formula $$Li_{1-x}AlP_xSi_{1-x}O_4$$

wherein x is between 0.05 and 0.65.

---

This invention relates to a ceramic material having a very low coefficient of thermal expansion and to the preparation of said material. More specifically, it relates to materials having chemical constituents represented by the general formula $$Li_{1-x}AlP_xSi_{1-x}O_4$$

wherein $x$ lies between about 0.05 and 0.65, which material is a true solid solution between $LiAlSiO_4$ (beta-eucryptite) and $AlPO_4$, the beta-eucryptite having a beta-quartz structure and the $AlPO_4$ having a cristobalite-, tridymite- or quartz-structure depending on the preparation temperature.

By varying the value of $x$ in the above formula, it is possible to produce a ceramic material in which the coefficient of thermal expansion may be controlled so that it is either a very small positive value or a negative value or zero, over wide ranges of temperature.

A preferred method for preparing the ceramic solid solution materials of this invention comprises mixing $AlPO_4$ and $LiAlSiO_4$ in suitable proportions and then heating the mixture in order to produce the desired solid solution.

In preparing the beta-eucryptite ($LiAlSiO_4$), properly proportioned mixtures of reagent grade $Al(OH)_3$, $SiO_2$ and $Li_2CO_3$ can be heated to temperatures sufficient to drive off $H_2O$ and $CO_2$ and to effect combination of the oxides to produce the beta-eucryptite. Equimolar mixtures of $Al(OH)_3$ and $(NH_4)_2HPO_4$ can be heated in the same manner to produce $AlPO_4$. After a mixture of $LiAlSiO_4$ (beta-eucryptite) and cristobalite structure $AlPO_4$ is formed, the mixture is pelletized and then heated for 16 hours at a temperature of 1050° C., or higher, the heating being in air. Then the product is air quenched, i.e., permitted to cool in air.

Another more economical method is by heating the natural mineral alpha-eucryptite ($LiAlSiO_4$) to 900° C.–1350° C. which will result in the conversion of the alpha-eucryptite to beta-eucryptite. The beta-eucryptite may be mixed in the correct proportions with the natural phosphate mineral berlinite ($AlPO_4$) then heated to the required temperature to form the beta-eucryptite solid solutions.

Depending on the relative proportions of the two preformed starting materials, the coefficient of expansion of the resulting solid solution is either zero, or a small positive value or a negative value.

In the following table there are presented values of the coefficient of expansion of the solid solutions of this invention.

LINEAR THERMAL EXPANSION DATA FOR PHOSPHORUS LITHIUM ALUMINOSILICATE BODIES

| Temp., °C. | Body composition (percent) AlPO₄ | | | | | | |
|---|---|---|---|---|---|---|---|
| | 0 | 10 | 20 | 30 | 40 | 50 | 65 |
| 100 | −0.05 | −0.04 | −0.03 | −0.02 | −0.01 | +0.01 | +0.02 |
| 300 | −0.25 | −0.20 | −0.15 | −0.08 | −0.03 | +0.03 | +0.06 |
| 500 | −0.46 | −0.37 | −0.25 | −0.16 | −0.09 | +0.04 | +0.08 |
| 700 | −0.62 | −0.49 | −0.35 | −0.21 | −0.13 | +0.05 | +0.10 |
| 900 | −0.65 | −0.53 | −0.40 | −0.27 | −0.16 | +0.05 | +0.11 |
| 1,000 | −0.70 | −0.55 | −0.44 | −0.33 | −0.25 | +0.05 | +0.11 |

Although many prior art and industrial ceramics are known which have extremely low coefficient of thermal expansion, insofar as the present inventor is aware all such materials consists of two phases, while the present material consists of a single phase solid solution and, therefore, possesses numerous advantages over such prior art and commercial compositions, e.g., it exhibits enhanced thermal shock resistance, variable thermal expansion properties, inexpensive production due to availability and cost of materials and facility of preparation.

It is believed that the intrusion of a pentavalent ion into the crystal lattice occurs only at the tetrahedral sites and that each atom of phosphorus replaces both a lithium atom and a silicon atom in the crystal lattice.

Glasses and glass ceramics can be formed in this phosphorus bearing compositional range. New beta-quartz glass ceramics may be formed with nucleating agents such as zirconia or titania by recrystallization of the glasses. Cation exchange or substitution on tetrahedral sites (phosphorus for silicon) besides the commonly used, for example $2Li^{+1}$ for $Mg^{2+}$, can be done giving surfaces under a state of compression via the differences in the expansion coefficients which should give increased flexural strengths. These beta-quartz ceramics are more thermally stable than the meta-stable beta-quartz ceramics existing in the high silica region.

With amounts of $AlPO_4$ above 50% it is necessary to heat to temperatures above 1050° C. in order to obtain a single phase solid solution. For example, for 65% $AlPO_4$ temperatures above about 1200° C. are required.

Having now described the invention, it is not intended that it be limited except as may be required by the appended claims.

I claim:
1. A single phase solid solution of beta-eucryptite and $AlPO_4$ having the formula

$$Li_{1-x}AlP_xSi_{1-x}O_4$$

wherein x lies between 0.05 and 0.65.
2. A solid solution of claim 1 produced by mixing and heating a mixture consisting of $AlPO_4$ and $LiAlSiO_4$.
3. A ceramic with a substantially zero coefficient of thermal expansion and having the formula of claim 1.

References Cited

Perotta, A. J., and Savage, R. O.: β-Eucryptite Crystalline Solutions Involving $P^{5+}$, in J. Amer. Cer. Soc., 50 (2) February 1967, p. 112.

TOBIAS E. LEVOW, Primary Examiner

WALTER R. SATTERFIELD, Assistant Examiner

U.S. Cl. X.R.

65—33